(12) United States Patent (10) Patent No.: US 9,383,864 B2
Morrison et al. (45) Date of Patent: Jul. 5, 2016

(54) ILLUMINATION STRUCTURE FOR AN INTERACTIVE INPUT SYSTEM

(75) Inventors: Gerald D. Morrison, Calgary (CA); Grant McGibney, Calgary (CA); Daniel P. McReynolds, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 444 days.

(21) Appl. No.: 12/751,996

(22) Filed: Mar. 31, 2010

(65) Prior Publication Data

US 2011/0241984 A1 Oct. 6, 2011

(51) Int. Cl.
*G06F 3/042* (2006.01)

(52) U.S. Cl.
CPC .... *G06F 3/0421* (2013.01); *G06F 2203/04104* (2013.01)

(58) Field of Classification Search
CPC ............... G06F 3/0421; G06F 2203/04104
See application file for complete search history.

(56) References Cited

U.S. PATENT DOCUMENTS

| | | | |
|---|---|---|---|
| 4,459,476 A * | 7/1984 | Weissmueller | G06F 3/0421 250/221 |
| 4,916,308 A * | 4/1990 | Meadows | 250/221 |
| 5,007,085 A * | 4/1991 | Greanias et al. | 726/34 |
| 5,229,551 A * | 7/1993 | McDermott et al. | 178/18.02 |
| 5,448,263 A | 9/1995 | Martin | |
| 5,596,347 A * | 1/1997 | Robertson et al. | 715/856 |
| 6,141,000 A | 10/2000 | Martin | |
| 6,337,681 B1 | 1/2002 | Martin | |
| 6,747,636 B2 | 6/2004 | Martin | |
| 6,803,906 B1 | 10/2004 | Morrison et al. | |
| 6,972,401 B2 | 12/2005 | Akitt et al. | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,460,110 B2 * | 12/2008 | Ung | G06F 3/03545 178/18.03 |
| 8,704,801 B2 * | 4/2014 | Tsai | G02B 6/0076 345/173 |
| 8,937,612 B2 * | 1/2015 | Zhu | G06F 3/0416 345/173 |
| 2004/0179001 A1 | 9/2004 | Morrison et al. | |
| 2005/0156900 A1 | 7/2005 | Hill et al. | |
| 2007/0257891 A1 * | 11/2007 | Esenther et al. | 345/173 |
| 2008/0278460 A1 * | 11/2008 | Arnett et al. | 345/175 |
| 2008/0309625 A1 * | 12/2008 | Krah et al. | 345/173 |

(Continued)

FOREIGN PATENT DOCUMENTS

WO WO 2009/0152715 * 12/2009 ............. H04W 4/00

*Primary Examiner* — Ilana Spar
*Assistant Examiner* — Mihir Rayan
(74) *Attorney, Agent, or Firm* — Perkins Coie LLP

(57) ABSTRACT

An illumination structure for an interactive input system having a display surface and a light source for backlighting the display surface is provided. The illumination structure includes at least one redirection structure positioned with respect to the display surface to receive excess light produced by the light source and to redirect the excess light generally across the display surface for backlighting one or more pointers. A method is provided for determining the location of at least one pointer in an interactive input system. The method includes capturing images generally across a display surface of a region of interest and a reflection of the region of interest; examining the images to determine at least one first potential target location for at least one pointer that is within the region of interest; analyzing the at least one first potential target location to resolve at least one first true target location associated with the at least one pointer; and calculating a first location for the at least one pointer corresponding to the at least one first true target location.

8 Claims, 13 Drawing Sheets

(56) References Cited

U.S. PATENT DOCUMENTS

| | | | |
|---|---|---|---|
| 2009/0278816 A1* | 11/2009 | Colson | G06F 3/0416 345/175 |
| 2010/0201812 A1 | 8/2010 | McGibney et al. | |
| 2011/0006981 A1 | 1/2011 | Chtchetinine et al. | |
| 2011/0074738 A1* | 3/2011 | Ye et al. | 345/175 |
| 2011/0080490 A1* | 4/2011 | Clarkson | G06F 3/017 348/222.1 |
| 2011/0109565 A1* | 5/2011 | Zhu et al. | 345/173 |
| 2011/0157096 A1* | 6/2011 | Drumm | G06F 3/0421 345/175 |

* cited by examiner

ILLUMINATION STRUCTURE FOR AN INTERACTIVE INPUT SYSTEM

FIELD OF THE INVENTION

The present invention relates generally to interactive input systems and in particular, to an illumination structure for an interactive input system.

BACKGROUND OF THE INVENTION

Interactive input systems that allow users to inject input such as for example digital ink, mouse events etc., into an application program using an active pointer (e.g., a pointer that emits light, sound or other signal), a passive pointer (e.g., a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 6,972,401; 7,232,986; 7,236,162; and 7,274,356 and in U.S. Patent Application Publication No. 2004/0179001 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Above-incorporated U.S. Pat. No. 6,803,906 to Morrison, et al. discloses a touch system that employs machine vision to detect pointer interaction with a touch surface on which a computer-generated image is presented. A rectangular bezel or frame surrounds the touch surface and supports digital cameras at its four corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are then conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Above-incorporated U.S. Pat. No. 6,972,401 to Akitt, et al. discloses an illuminated bezel for use in a touch system such as that disclosed in above-incorporated U.S. Pat. No. 6,803,906. The illuminated bezel comprises infrared (IR) light emitting diodes (LEDs) that project infrared light onto diffusers. The diffusers in turn, diffuse the infrared light so that the intensity of backlighting provided over the touch surface by the illuminated bezel is generally even across the surfaces of the diffusers. As a result, the backlight illumination provided by the bezel appears generally continuous to the digital cameras. Although this illuminated bezel works very well, it adds cost to touch system.

In some environments, users interact with the touch surface using a single pointer. In some other environments, such as that described in U.S. patent application Ser. No. 10/750,219 to Hill, et al., assigned to SMART Technologies ULC, the content of which is incorporated by reference, multiple users may interact with the touch surface simultaneously, or a single user may interact with the touch surface using a plurality of pointers.

As will be appreciated, in machine vision touch systems, when a single pointer is in the fields of view of multiple imaging devices, the position of the pointer in (x,y) coordinates relative to the touch surface typically can be readily computed using triangulation. Difficulties are however encountered when multiple pointers are in the fields of view of multiple imaging devices as a result of pointer ambiguity and occlusion. Ambiguity arises when multiple pointers in the images captured by the imaging devices cannot be differentiated. In such cases, during triangulation a number of potential positions for the pointers can be computed but no information is available to the system to allow the correct pointer positions to be resolved. Occlusion occurs when one pointer occludes another pointer in the field of view of an imaging device. In such an instance, an image captured by an imaging device includes only one pointer. As a result of occlusion, the correct positions of all of the pointers relative to the touch surface cannot be disambiguated.

According to U.S. patent application Ser. No. 12/501,088 to Chtchetinine, et al., assigned to SMART Technologies ULC, the content of which is incorporated by reference, the placement of additional imaging devices with different vantages improves disambiguation and reduces difficulties with occlusion, because the field of view of each imaging device looks at the pointers from a different angle. The additional imaging devices enable improvements in accuracy of the triangulation. Although increasing the number of imaging devices allows pointer ambiguity and occlusion to be resolved, this of course results in increased touch system cost and complexity.

U.S. patent application Ser. No. 12/369,473 to McGibney, et al., assigned to SMART Technologies ULC, the content of which is incorporated by reference, describes a method for distinguishing between a plurality of pointers in an interactive input system. The method comprises calculating a plurality of potential coordinates for a plurality of pointers in proximity of an input surface of the interactive input system, displaying visual indicators associated with each potential coordinate on an input surface, and determining real pointer locations and imaginary pointer locations associated with each potential coordinate from the visual indicators.

While the above provides a useful method, improvements are of course desirable. It is therefore an object of the present invention to provide a novel interactive input system.

SUMMARY OF THE INVENTION

According to an aspect there is provided an illumination structure for an interactive input system that has a display surface and a light source for backlighting the display surface, the illumination structure comprising:

at least one redirection structure positioned with respect to the display surface to receive excess light produced by the light source and to redirect the excess light generally across the display surface for backlighting one or more pointers.

According to another aspect there is provided an interactive input system comprising:

a display device having a display surface and a light source for backlighting the display surface;

an imaging system capturing images of a region of interest from different vantages; and an illumination structure receiving excess light produced by the light source and redirecting the excess light generally across the region of interest for backlighting one or more pointers.

According to another aspect there is provided a method for determining the location of at least one pointer in an interactive input system comprising:

capturing images generally across a display surface of a region of interest and a reflection of the region of interest;

examining the images to determine at least one first potential target location for at least one pointer that is within the region of interest;

analyzing the at least one first potential target location to resolve at least one first true target location associated with the at least one pointer; and calculating a first location for the at least one pointer corresponding to the at least one first true target location.

According to another aspect there is provided an interactive input system comprising:

a region of interest associated with a display surface;

a mirror positioned with respect to the region of interest and producing a reflection thereof;

an imaging system capturing images of the region of interest and the reflection from different vantages; and processing structure for examining the captured images to determine at least one first potential target location for at least one pointer in the region of interest, analyzing the at least one first potential target location to resolve at least one first true target location associated with the at least one pointer, and calculating a first location for the at least one pointer corresponding to the at least one first true target location.

According to another aspect there is provided a computer readable medium embodying a computer program for determining the location of at least one pointer in an interactive input system, the computer program comprising:

program code for capturing images generally across a display surface of a region of interest and a reflection of the region of interest;

program code for examining the images to determine at least one first potential target location for at least one pointer that is within the region of interest;

program code for analyzing the at least one first potential target location to resolve at least one first true target location associated with the at least one pointer; and program code for calculating a first location for the at least one pointer corresponding to the at least one first true target location.

According to another aspect there is provided a method for determining the location of at least two pointers in an interactive input system comprising:

capturing images from different vantages of a region of interest and a reflection of the region of interest;

examining the images to identify a plurality of potential target locations for the at least two pointers in the region of interest;

analyzing the plurality of potential target locations to resolve a true target location associated with each of the at least two pointers; and calculating a location associated with each of the true target locations.

According to another aspect there is provided an interactive input system comprising:

a region of interest associated with a display surface;

a mirror producing a reflection of the region of interest;

an imaging system capturing from different vantages images of the region of interest and the reflection; and processing structure for examining the images to identify a plurality of potential target locations for at least two pointers in the region of interest, analyzing the plurality of potential target locations to resolve a true target location associated with each of the at least two pointers, and calculating a location associated with each of the true target locations.

According to another aspect there is provided a computer readable medium embodying a computer program for determining a location of at least two pointers in an interactive input system, the computer program comprising:

program code for capturing images from different vantages of a region of interest and a reflection of the region of interest;

program code for examining the images to identify a plurality of potential target locations for the at least two pointers in the region of interest;

program code for analyzing the plurality of potential target locations to resolve a true target location associated with each of the at least two pointers; and program code for calculating a location associated with each of the true target locations.

BRIEF DESCRIPTION OF THE DRAWINGS

Embodiments will now be described more fully with reference to the accompanying drawings in which.

DETAILED DESCRIPTION OF THE EMBODIMENTS

Figure 1:
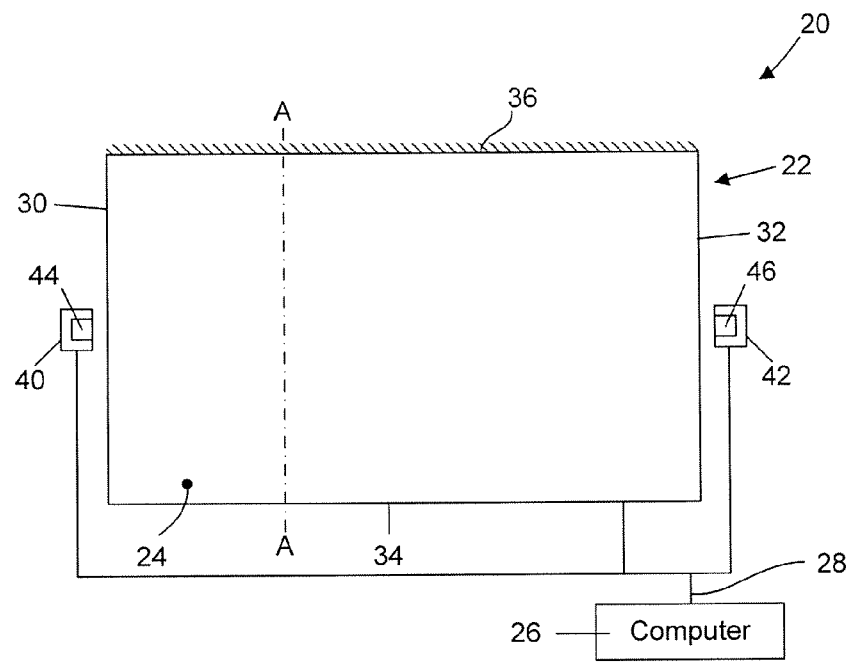
FIG. 1 is a schematic diagram of an interactive input system.

Turning now to FIG. 1, an interactive input system that allows a user to inject input such as "ink" into an application program is shown and is generally identified by reference numeral 20. In this embodiment, interactive input system 20 comprises an assembly 22 that engages a display device (not shown) such as for example, a liquid crystal display (LCD) device, and surrounds the display surface 24 of the display device. A region of interest—in this embodiment a pointer input region—is associated with the display surface 24, and the assembly 22 surrounds and generally delineates the region of interest.

The assembly 22 employs an imaging system comprising multiple image sensors to capture images across the display surface and communicate (via a universal serial bus (USB) cable 28) with a processing structure, in this embodiment a computer 26, executing one or more application programs. Computer 26 processes the images output by the imaging system to detect the locations of one or more pointers in the region of interest and to adjust data being output to the display device so that the image presented on the display surface 24 reflects pointer activity. In this manner, pointer activity in the region of interest can be recorded as writing or drawing or used to control execution of one or more application programs executed by the computer 26.

Assembly 22 comprises an illumination structure that is affixed to the display device. In this embodiment, the illumination structure comprises a redirection structure comprising three redirection bezels 30, 32 and 34. The redirection bezels 30 and 32 extend along opposite edges of the display surface 24, whereas redirection bezel 34 extends along the bottom edge of the display surface 24. A mirror 36 extends along the top edge of the display surface 24, opposite redirection bezel 34, and is configured to face the region of interest.

The redirection bezels 30 to 34 receive excess visible light emitted by the light source that backlights the display device, and redirects the excess light across the display surface 24. The redirected excess light backlights pointer(s) positioned in the region of interest to, from the standpoint of the imaging devices, create light contrast with the pointer(s). Mirror 36 serves to provide reflections of the redirection bezels 30 to 34 for the image sensors, and any pointers positioned within the region of interest, to facilitate touch detection as will be described.

In this embodiment, image sensors 40 and 42 are located generally at the midpoint of respective ones of the redirection bezels 30 and 32. The image sensors 40 and 42 are positioned to look generally across the display surface 24 from different vantages. In this embodiment, image sensors 40 and 42 are wide-angle cameras that have a 180-degree field of view (FOV), and are sensitive to both visible and infrared light. As one skilled in the art would appreciate, image sensors 40 and 42 are preferably positioned a small distance behind their respective redirection bezels 30 and 32 to ensure an inclusive field of view despite small discrepancies to their standard 180 degree field of view, and also to avoid large distortion at the edge of the FOV.

Infrared (IR) light sources 44 and 46 are positioned proximate to each of the image sensors 40 and 42. The IR light sources 44 and 46 can be conditioned to emit infrared illumination so that a pointer positioned in proximity with the display surface 24 can be selectively front-lit by infrared radiation, as will be described.

Figure 2:
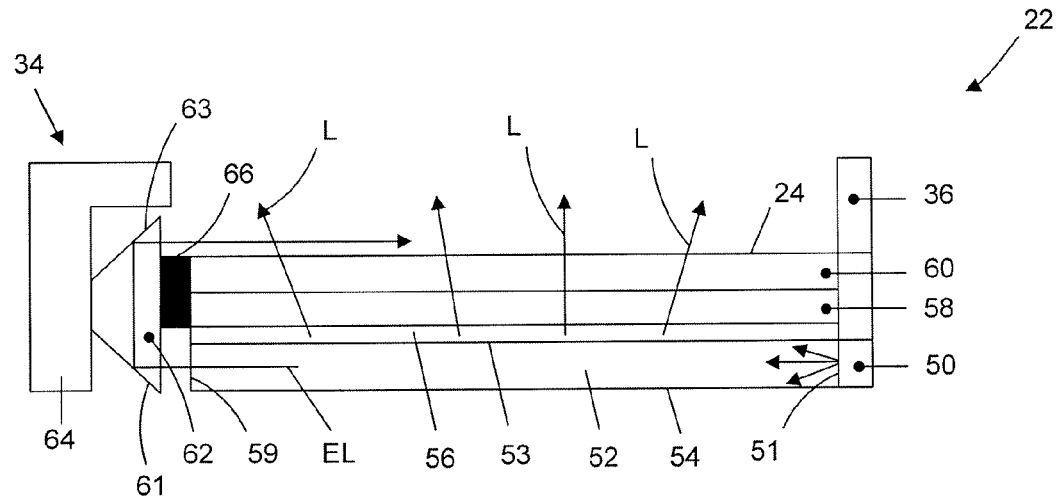
FIG. 2 is a cross-sectional view of part of the interactive input system in FIG. 1, taken along line A-A.

FIG. 2 is a cross-sectional view of a portion of the interactive input system including the display device and assembly 22, taken along line A-A of FIG. 1. The display surface 24 is illuminated by a light emitting diode (LED) light source 50 that is positioned underneath mirror 36. In this embodiment, the light source 50 emits visible light that is distributed through a light guide 52 that generally spans the same area as the display surface. The light guide 52 is coated with a layer of reflective material 54, which reflects much of the light received from the light source 50 to pass through a diffuser layer 56 to uniformly distribute the light L through LCD panel 58. The light passing through the LCD panel 58 illuminates the display surface 24. LCD panel 58 is covered with a clear protective layer 60 which in this embodiment is a clear sheet of glass.

The reflective material 54 is capable of reflecting only a portion of the light produced by the light source 50. As such, a portion of the produced light is not passed through the LCD panel 58 to illuminate the display surface 24 and is able to escape from an end surface 59 of the light guide 52.

Each bezel 30, 32 and 34 has a redirection structure that is positioned with respect to the light guide 52 to receive excess light EL that has escaped from a respective end 59 of the light guide 52, and to reflect the excess light EL generally across the display surface 24 to provide backlighting for any pointers. For example, as shown in FIG. 2, redirection bezel 34 comprises a redirection structure 62 connected to bezel frame 64. Bezel frame 64 protects redirection structure 62. The top of the bezel frame 64 extends over the redirection structure 62 to prevent redirected light from projecting above the display surface 24. In this embodiment, the redirection structure 62 is also connected to the display device by use of a spacer 66, such as glue. Alternatively, the spacer 66 may be made of a piece of transparent, semi-transparent or diffusive material.

In this embodiment, redirection structure 62 is an acrylic prism that extends along a respective side of the region of interest. The acrylic has an index of refraction greater than 1.42. The prism has a first forty-five (45) degree surface 61 redirecting (reflecting or diffusing) the excess light EL towards a second forty-five (45) degree surface 63. The second 45 degree surface 63 redirects at least part of the excess light EL it receives across the display surface 24. The first and second 45 degree surfaces 61 and 63 are smooth surfaces allowing total internal reflection of excess light EL. As will be appreciated, the medium contacting the surfaces 61 and 63

(such as ambient air) is selected to preserve total internal reflection in the prism. It will be noted that redirection structure 62 is positioned such that at least a portion of the second surface 63 is at least slightly higher than the display surface 24 such that the excess light EL can be redirected above and across display surface 24.

It will be appreciated that redirection bezels 30 and 32 have a similar configuration to redirection bezel 34. As will be appreciated, redirection bezels 30 to 34 form a uniform illumination source along three sides of the region of interest so that a pointer positioned within the region of interest is backlit by the redirected light from the points of view of the imaging sensors.

A pointer or pointers in the region of interest may be detected in images captured by image sensors 40 and 42 as one or more dark or light regions created by generating a contrast difference between the pointer(s) and the background. More particularly, if a pointer is within the region of interest, in a captured image the pointer will occlude the redirected backlighting from the redirection bezels 30 to 34. As a result, the pointer will appear as a dark region interrupting the bright band created by redirection bezels 30 to 34. The image is analyzed to determine the size of the dark region. The size of the dark region determines whether the dark region is due to the presence of a pointer, or may be attributed to a larger object such as a user's palm. As will be described, if the larger object is detected, steps are taken to distinguish the palm from the pointer being held by the user's hand, as will be described.

The interactive input system 20 is designed to detect presence within the region of interest of a pointer such as for example, a user's finger F, a cylinder or other suitable object. The interactive input system 20 may also detect a pen tool P that has a retro-reflective or highly reflective tip being brought into the region of interest, and may undertake steps to reject a user's palm as itself being a pointer during a palm reject routine. The system is also capable of tracking multiple pointers in the region of interest simultaneously.

In general, during operation, the light source 50 is turned on and off (i.e., modulated) according to a predetermined pattern at a speed that is unnoticeable to a person viewing the display device. With the modulation, the excess light from the light source that is redirected across the display surface is also modulated. The modulation of the pointer backlighting causes images to be captured by the image sensors 40 and 42 with either pointer backlighting on, or pointer backlighting off.

In this embodiment, IR light sources 44 and 46 remain off until the presence of a large object, such as a palm, is detected due to its detected size to be in the region of interest. This mode is referred to as palm reject mode. In general, when it is detected that a large object is in proximity with the display surface 24, IR light sources 44 and 46 are operative to cause pen tool P having a retro-reflective or highly reflective tip to appear front-lit in the capture images. The use of IR light sources 44 and 46 will be discussed in further detail below.

As will be appreciated, the presence of ambient light must be dealt with during pointer detection. Ambient light may comprise external light (e.g., sunlight and/or room light), and light reflected or emitted by other objects that happen to be proximal to the interactive input system. In the event that the system 20 identifies the presence of a large object, such as a palm, in a captured image, at least one of the IR light sources 44 and 46 will be switched on. In this instance, the light being redirected across the display surface by the redirection structure will, for the purpose of pointer detection, interfere with the IR light emitted by one of the IR light sources 44, 46. The redirected light is thus filtered out in order to leave a dark background for contrast with the retro-reflective tipped pointer that has been front-lit by an IR light source. This light is rejected based on its distinct switching pattern for modulation, as will now be discussed.

A modulated-light method is used to provide the capability of ambient light rejection, multiple pointer detection, and palm rejection. In this embodiment, the modulated-light method used is disclosed in U.S. Patent Application No. 2009/0278794, assigned to the assignee of the subject application, the contents of which are incorporated by reference. In general, this method modulates the LED backlight 50, as well as the IR light sources 44 and 46 (when in operation) according to a distinct orthogonal code.

Figure 3:
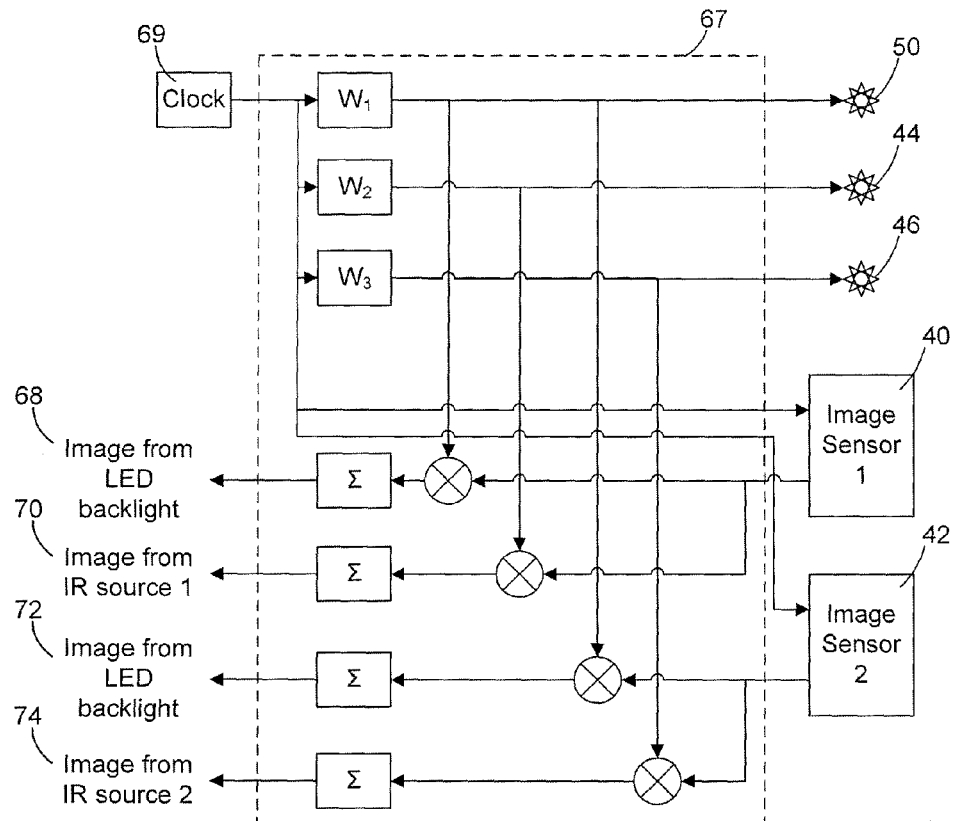
FIG. 3 is a schematic diagram of modulation and demodulation components of the interactive input system.

Turning now to FIG. 3, a system diagram of light modulation and image demodulation according to the modulated-light method is shown. As one skilled in the art would appreciate, the function blocks, that is, the dashed line identified by reference numeral 67, may be integrated into a modulated lighting controller, or may be implemented as a separate control circuit coupled to each of the illumination sources (LED backlight 50, IR light sources 44 and 46), as well as the image sensors 40 and 42. In this embodiment, the modulated lighting controller is implemented on an integrated circuit, such as a field programmable gate array (FPGA).

In this embodiment, the orthogonal properties of Walsh codes are employed to modulate the LED backlight (and consequently the redirection segments 30 to 34) and the IR light sources 44 and 46 thereby to allow the image contributions of different light sources to be separated. For example, Walsh code words $W_1=\{1, -1, 1, -1, 1, -1, 1, -1\}$ and $W_2=\{1, 1, -1, -1, 1, 1, -1, -1\}$ are orthogonal meaning that when corresponding elements are multiplied together and summed, the result is zero. As will be appreciated, light sources cannot take on negative intensities. The LED backlight 50, the IR light source 54 and the IR light source 56 are therefore each turned on and off where a Walsh code word bit of value $\{1\}$ signifies an on condition and a Walsh code word bit of value $\{-1\}$ signifies an off condition.

In this embodiment, a clock 69 in the form of a crystal oscillator is used to control the light modulation so that LED backlight 50 and the IR light sources 44 and 46 are turned on and off at a light modulation rate of $f_c$ (Hz). The LED backlight 50 and the IR light sources 44 and 46 are turned on for a duration of $1/f_c$ seconds when a Walsh code word bit value of 1 is applied and similarly, are turned off for a duration of $1/f_c$ seconds when a Walsh code word bit value of 0 is applied.

Image sensors 40 and 42 are controlled by the clock 69 and synchronized with the illumination sources to capture images at a subframe rate of $f_c$ images per second. As will be appreciated, a captured image is denoted as an image subframe. An image frame is made up of n image subframes, where n is the length of the Walsh code. Each image frame is demodulated to generate a frame image.

Image frame demodulation for a Walsh code word $W_i$ multiplies the Walsh code bit value with its respective subframe, and the result is added together:

$$I_k = b_1 I_{k1} + b_2 I_{k2} + \ldots + b_n I_{kn},$$

where $I_k$ is the k-th resultant frame image, $b_m$, m=1, 2, ..., n is the Walsh code word bit value at code word bit m, and $I_{km}$, m=1, 2, ..., n is the subframe of the k-th image frame. As will be appreciated, a subframe $I_{km}$ is added to the resultant image frame $I_k$ if the corresponding Walsh code word bit value $b_m$ is $\{1\}$, or is subtracted from the resultant image frame $I_k$ if the corresponding Walsh code word bit value $b_m$ is $\{-1\}$. Since Walsh code words $W_1$, $W_2$, and $W_3$ are orthogonal, the light modulated by a different Walsh code word is eliminated from the resultant frame images.

Figure 4:
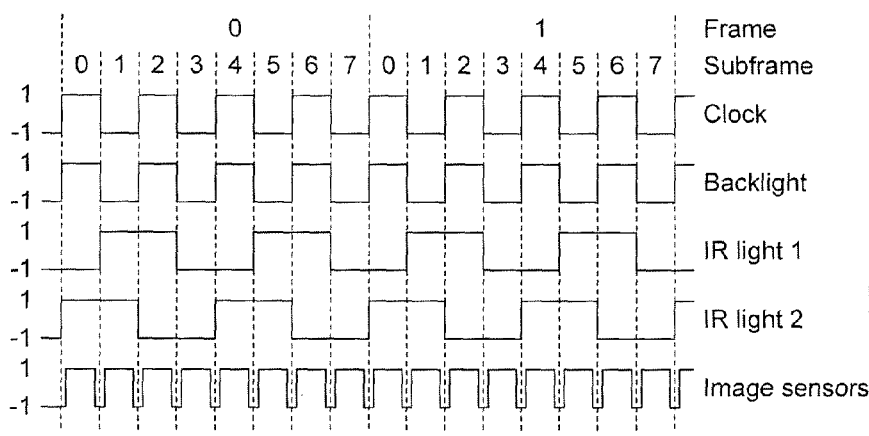
FIG. 4 is a diagram showing relative timing of light modulation and image sensing for the interactive input system.

FIG. 4 is a timing diagram of the light sources and image sensors for the interactive input system 20. In this embodiment, Walsh code words $W_1=\{1, -1, 1, -1, 1, -1, 1, -1\}$, $W_2=\{1, 1, -1, -1, 1, 1, -1, -1\}$ and $W_3=\{1, -1, -1, 1, 1, -1, -1, 1\}$ are employed at a light modulation rate of $f_c=960$ Hz. The image sensors 40 and 42 are operated by the modulated lighting controller synchronously with the on/off switching patterns of the LED backlight 50, the IR light source 54 and the IR light source 56. The image sensors 40 and 42 capture images at a subframe rate of 960 subframes per second, where each 8 subframes consist of an image frame, giving each image sensor a frame rate of 120 frames per second (fps).

In this embodiment, Walsh code words $W_1=\{1, -1, 1, -1, 1, -1, 1, -1\}$, $W_2=\{1, 1, -1, -1, 1, 1, -1, -1\}$ and $W_3=\{1, -1, -1, 1, 1, -1, -1, 1\}$ are of interest as they have spectral nulls at dc and 120 Hz when the light modulation rate is $f_c=960$ Hz. As a result, frequencies at dc and 120 Hz are eliminated after demodulation allowing the effects of external steady state light (e.g., sunlight), and the effects of light sources (e.g., fluorescent and incandescent light sources etc.) that flicker at common frequencies, i.e., 120 Hz in North America to be filtered out. If the interactive input system 20 is used in different environments where lighting flickers at a different frequency the light modulation rate $f_c$ is adjusted to filter out the effects of this flickering light. For example, if the interactive input system 20 is to be used in Europe, where the lighting flickers at a frequency of 100 Hz, the light modulation rate $f_c$ can be adjusted to 800 Hz, which gives rise to the frame rate of 100 fps.

Turning back to FIG. 3, the Walsh code word $W_1$ is used to demodulate the output of image sensors 40 and 42 and obtain a sequence of resultant frame images 68 and 72, respectively, consisting of images captured from the contribution of only LED backlight 50 in which pointer contacts are detected as dark regions interrupting a bright band. Similarly, Walsh code word $W_2$ is used to demodulate the output of the image sensor 40 and obtain a sequence of resultant frame images 70, consisting of images captured from the contribution of only IR light source 44, in which case a retro-reflective or highly reflective pen tip brought into proximity with display surface 24 is detected as a bright region interrupting a dark background. Further, Walsh code word $W_3$ is used to demodulate the output of the image sensor 42 and obtain a sequence of resultant frame images 74, consisting of images captured from the contribution of only IR light source 46, in which case a retro-reflective or highly reflective pen tip brought into proximity with display surface 24 is detected as a bright region interrupting a dark background.

As described previously, interactive input system 20 is capable of detecting an unreflective pointer as well as a retro-reflective pen tool P. The system is also capable of detecting the presence of a pen tool P having a retro-reflective or highly reflective tip in the event that the palm of a user's hand is brought into proximity with the display surface 24 while holding the pen tool P, as will be described.

Figure 5:
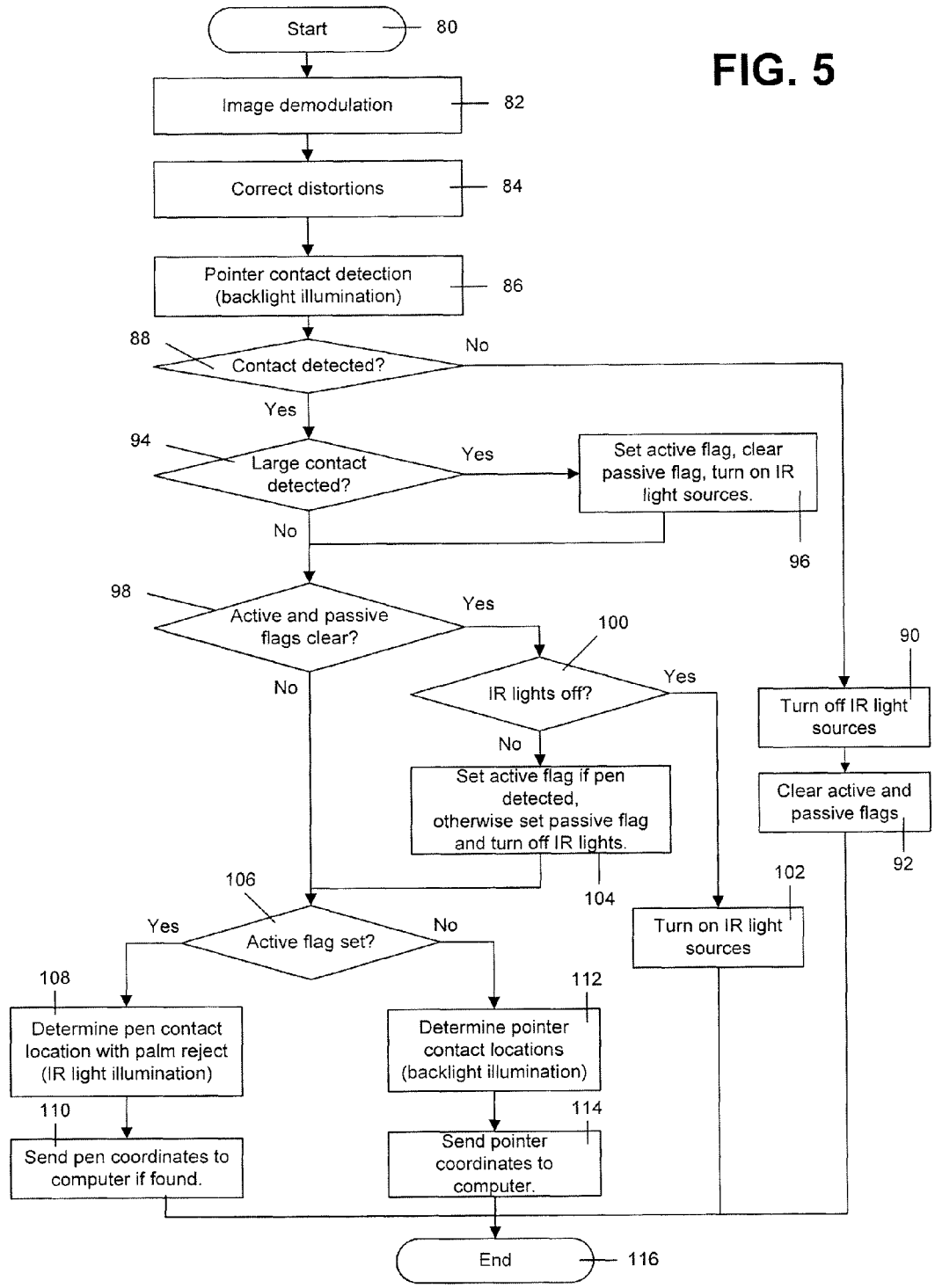
FIG. 5 is a flow chart of an exemplary method of pointer contact detection.

Turning now to FIG. 5, an exemplary method of pointer contact detection is shown, where the system 20 processes two flags. A passive flag having an "on" and "off" condition is used to indicate the presence of a passive pointer. An active flag having an "on" and "off" is used to indicate the presence of an active pointer for the palm reject mode. As will be appreciated, when these flags are cleared, their conditions are set to "off". Similarly, when these flags are set their conditions are set to "on".

When the system 20 is in use, image sensors 40 and 42 capture images from different vantage points across the display surface 24 (step 80). In the event that the backlight 50 (and consequently redirection segments 30 to 34) is the illumination source, the images are demodulated using the Walsh code word $W_1$ (step 82). Similarly, in the event that IR light source 44 and 46 are the illumination source, the images are demodulated using the Walsh code word $W_2$ and $W_3$, respectively (step 82). The resultant image frames are processed to correct distortions (step 84). The system 20 detects whether there is pointer contact detection based on the contribution of only the backlight 50 by processing frame images 68 and 72 (as identified in FIG. 3). If no pointer contact is detected (step 88), the status of the IR light sources 44 and 46 is determined, and if they are in operation, they are turned off (step 90), and the active and passive flags are cleared (step 92). The method then ends (step 116), and the method restarts at step 80.

In the event that pointer contact is detected (step 88), the system 20 detects the position and size of each pointer contact, and determines if any of the contacts have a size greater than the predefined threshold to indicate the presence of palm (step 94). In the event that a palm is detected, the active flag is set and the passive flag is cleared (step 96). The system 20 then checks the status of the active and passive flags (step 98).

If the active and passive flags are clear, the status of the IR light sources 44 and 46 is determined (step 100). If the IR light sources 44 and 46 are not on, the system 20 switches them on (step 102), the method ends (step 116), and the method restarts at step 300. If (at step 100) the IR light sources 44 and 46 are on, the system 20 detects whether there is pointer contact detection based on the contribution of the IR light sources 44 and 46 by processing frame images 70 and 74 (as identified in FIG. 3). If a pointer is detected based on the contribution of IR light sources 44 and 46, the active flag is set (step 104). Conversely, if a pointer is not detected based on the contribution of IR light sources 44 and 46, the passive flag is set and the IR light sources 44 and 46 are turned off (step 104).

The system 20 the checks the status of the active flag (step 106). If the active flag is set, the system is in palm reject mode and the location of the pointer is determined (step 108) by processing frame images 70 and 74. The active pen coordinates are then sent to the computer 26. The method then ends (step 116), and the method restarts at step 80.

If the active flag is not set (or conversely, the passive flag is set) at step 106, the location of the passive pointer is determined (step 112) by processing frame images 68 and 72. The passive pointer coordinates are then sent to the computer 26 (step 114). The method then ends (step 116), and the method restarts at step 80.

Figure 6A:
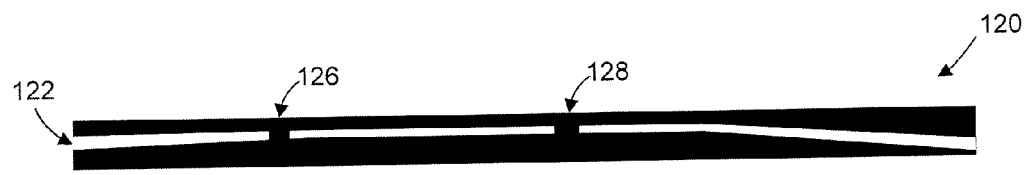
FIGS. 6a and 6b illustrate the frames captured by an imaging device while a finger is proximal the display surface.
Figure 6B:
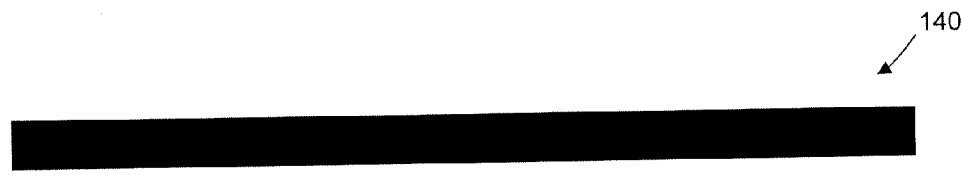

FIGS. 6A and 6B illustrate the resultant frame images 120 and 140 illuminated by LED backlight 50 and IR light source 44, respectively, obtained by image sensor 40 in the event that a finger is brought into proximity with the display surface 24. Frame image 120 comprises a bright band 122, representing the illumination emitted by redirection bezels 30 to 34 and their image in mirror 36, in a dark background.

A pointer brought into proximity with the display surface 24 as viewed by image sensor 40 occludes light emitted by the bright band formed by redirection bezels 30 to 34, and appears as a dark band 126 corresponding to its virtual image, and as a dark band 128 corresponding to its real image. To detect the pointer, the system calculates a vertical intensity profile (VIP) for the resultant frame image, which is the sum of the intensity values of the pixels in each pixel column of the frame image, and then searches for the abrupt VIP value change larger than a predefined threshold value. In this embodiment, the VIP is calculated according to the method disclosed in PCT Patent Application Publication No. 2009/135313, assigned to SMART Technologies ULC of Calgary, Alberta, the assignee of the subject application, the contents of which are incorporated by reference.

As will be appreciated, a finger does not reflect a significant amount of light to the image sensor 40, and therefore image frame 140 appears dark and no abrupt VIP change can be identified thereon.

FIGS. 6A and 6B illustrate the resultant frame images 160 and 180 illuminated by LED backlight 50 and IR light source 44, respectively, obtained by image sensor 40, in the event that a pen tool with a retro-reflective tip is brought into proximity with the display surface 24. Image 160 is the frame image illuminated by redirection bezels 30 to 34, and comprises a bright band 162 in a dark background. Two dark regions 164 and 166 appear in the bright band 162, representing the pen tip. As will be appreciated, the leftmost image 164 must be the virtual image as viewed by image sensor 40, and the rightmost image 166 must be the real image.

Image frame 180 is the frame image illuminated by the IR light source 44 as viewed by image sensor 40. Two bright regions 182 and 184 are seen in the dark background. Similar to above, the leftmost image 182 must be the virtual image and the rightmost image 184 must be the real image.

Figure 8A:
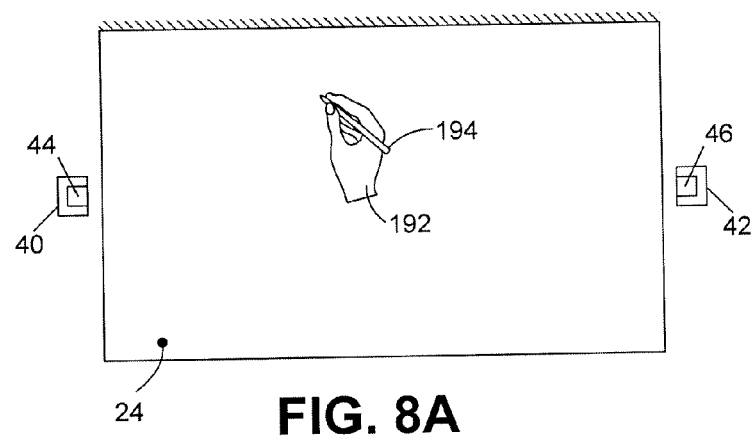
FIG. 8A is an elevation view of a hand holding a pen tool proximal the display surface.

FIG. 8A illustrates a hand 192 holding a pen tool 194 having retro-reflective tip brought into proximity with the display surface 24. Both the palm and the pen tip are in the FOV of the image sensor 40. With the assistance of the IR light source 44, the image sensor 40 can see the tip of the pen tool 194, as will be discussed below.

Figure 8B:
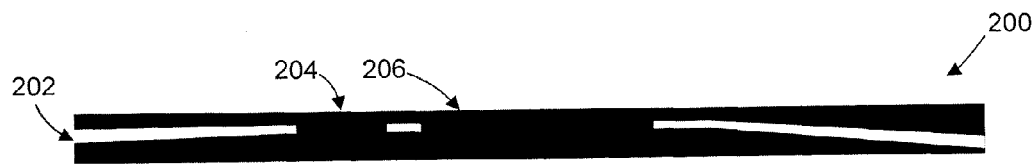
FIG. 8B illustrates a frame captured by an imaging device while the hand and pen tool are positioned as shown in FIG. 8A and backlit by excess light from the backlight light source of the display device.

FIG. 8B illustrates the resultant frame image 200 generated from the image sensor 40 illuminated by the redirection bezels 30 to 34. Frame image 200 comprises a bright band 202 in a dark background. Image sensor 40 views two large dark regions 204 and 206 occluding light emitted from the bright band 202. As will be appreciated, the leftmost image 204 represents the virtual image and the rightmost image 206 represents the real image. The tip of the pen tool 194 is not recognizable because it blocked by the palm 192.

Figure 7A:
FIGS. 7a and 7b illustrate frames captured by an imaging device while a pen tool is proximal the display surface.
Figure 7B:

The system calculates the width of dark regions 204 and 206, and checks if they are larger than a width threshold predefined in accordance with the width of a typical finger/pen. In the example shown in FIG. 7B, the system detects that the dark regions 204 and 206 are larger than the width threshold, and thus the system goes into palm detect mode.

Figure 8C:
FIG. 8C illustrates a frame captured by an imaging device while the hand and pen tool are positioned as shown in FIG. 8A and front lit by an infrared light source.

As described above, the system turns on the IR light sources 44 and 46. As will be appreciated, the presence of the palm in FIG. 8A blocks image sensor 42 from being able to see the pen tool 194, however image sensor 40 will be able to see pen tool 194. FIG. 8C illustrates the resultant frame image 220 generated from the image sensor 40 illuminated by IR light source 44. Pen tool 194 produces two images 222 and 224, while the palm 192 does not produce any images as it does not reflect a significant amount of IR light to the image sensor 40. The leftmost image 222 represents the virtual image and the rightmost image 224 represents the real image.

In the event of a single pointer, such as the embodiments described above with reference to FIGS. 6A to 8C, the system uses triangulation to determine the position of the pointer brought into proximity with the display surface 24. As will be appreciated, in the event that more than one pointer is brought into proximity with the display surface 24, mirror 36 is utilized to imagine a virtual sensor for each of the image sensors 40 and 42.

Figure 9:
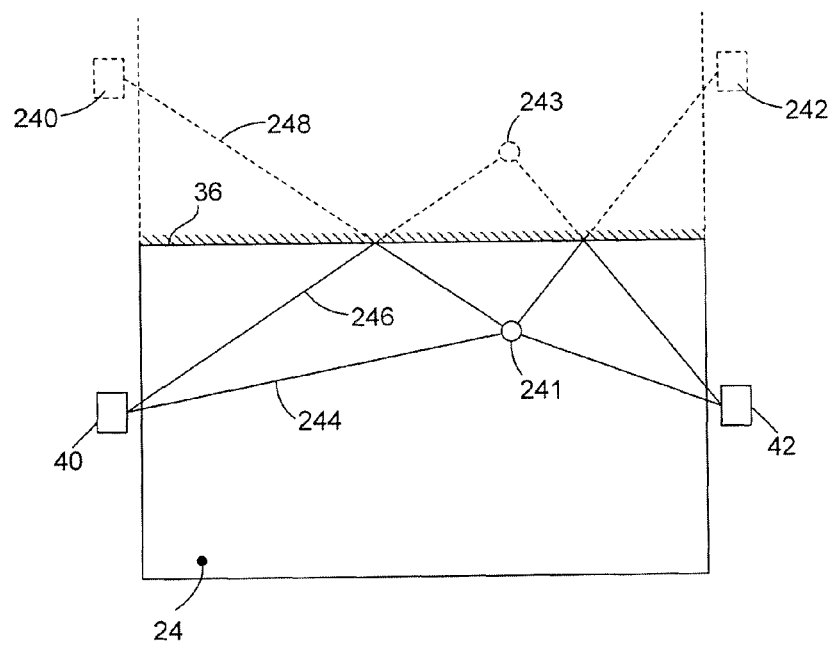
FIG. 9 is an elevation view of a display surface, region of interest, and mirror, and also illustrates the concept of real and virtual image sensors for locating a pointer in the region of interest.

FIG. 9 is a front view of real (40, 42) and virtual (240, 243) image sensors in the event that a pointer brought into proximity with the display surface 24. The image sensor 40 views two pointer images, that is, the pointer image 241 viewed along line of sight 244 and pointer image 243 viewed along line of sight 246. It is easily determined that the leftmost image viewed by image sensor 40 corresponds to a "virtual" image and the rightmost image viewed by image sensor 40 corresponds to a "real" image. Similarly, it is easily determined that the rightmost image viewed by image sensor 42 corresponds to a "virtual" image and the leftmost image viewed by image sensor 42 corresponds to a "real" image.

Consequently, image sensor 40 views virtual image 243 along the line of sight 246. Equivalently, a virtual image sensor 240 can be imagined at a mirror positioned equivalent to image sensor 40. Virtual image sensor 240 views real image 241 along line of sight 248. Since image sensor 40 and virtual image sensor 240 are effectively reflections of one another, the position of the virtual image sensor 240 is known. Similarly, virtual image sensor 242 can be imagined for image sensor 42.

The utilization of mirror 36 allows the system to be imagined and equivalent to a touch system having four image sensors, 40, 240, 42, and 242. The four-camera triangulation method is then used to determine the position of the pointer contact. Any two of these four image sensors can be used to triangulate the position of pointer 241. In the event that no obstructions (such as a palm) block the view of any one of the image sensors, the image sensors can be paired (40 and 240, 40 and 42, 42 and 242, 240 and 242) to obtain four possible pointer positions, which are then averaged to obtain a very accurate pointer position. The four-camera triangulation method is further described in U.S. Pat. No. 6,803,906 to Morrison, et al.

As will be appreciated, when a pointer is brought into close proximity with the mirror 36, each image sensor 40 and 42 will only view one image (that is, the reflected image for each image sensor will be overlapped). The four-camera triangulation method is still feasible in calculating the position of the pointer.

In the event that only one image sensor can see the pointer due to the other image sensor's field of view being blocked by an object such as a palm (similar to that previously described with reference to FIG. 8A), the system is reduced to a two-camera system. The position of the pointer can still be determined using simple triangulation.

When a single pointer exists in the image frames captured by the image sensors 40 and 42, the location of the pointer relative to the display surface can be readily computed. When multiple pointers exist in the image frames captured by image sensors 40 and 42, computing the positions of the pointers is more challenging as a result of pointer ambiguity.

Figure 10A:
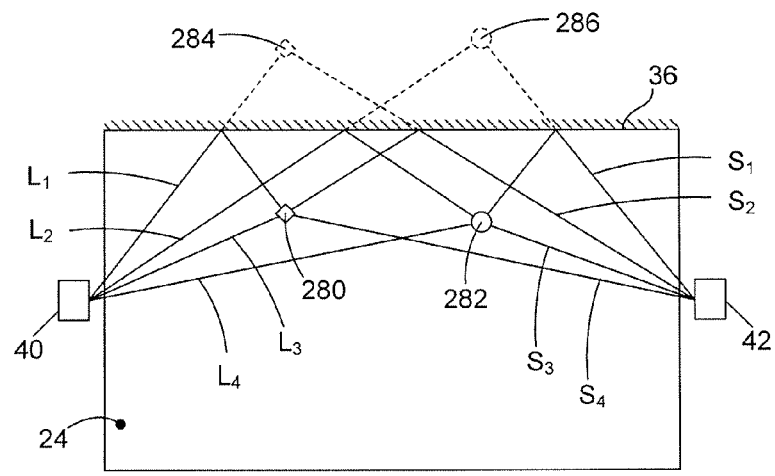
FIG. 10A illustrates the concept of real and virtual pointer locations when two pointers are in the region of interest.
Figure 11:
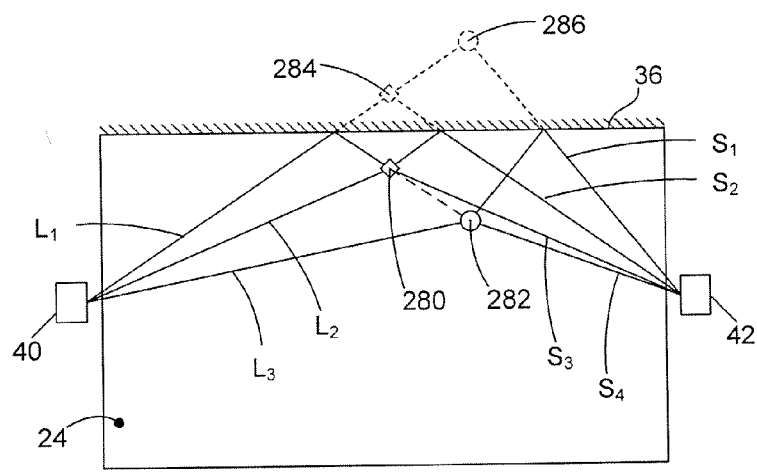
FIGS. 11 and 12 illustrate the concept of real and virtual pointer locations for resolving pointer locations when one pointer occludes another pointer.
Figure 12:
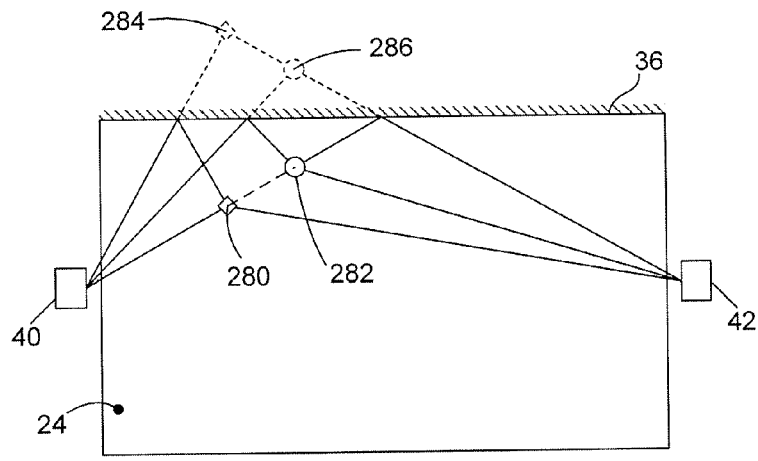
Figure 13:
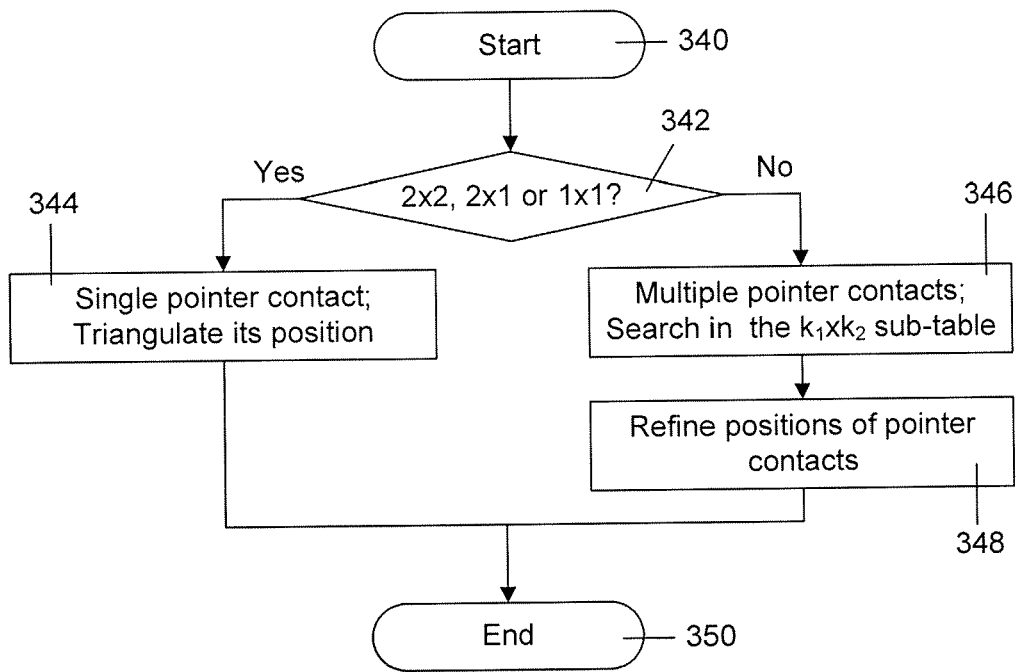
FIG. 13 is a flowchart having steps for calculating potential multiple pointer contact target locations.

FIGS. 10A, 11 and 12 illustrate some exemplary scenarios where two pointers 280 and 282 are brought into proximity with the display surface 24. In FIG. 10a, each image sensor 40 and 42 see four pointer images. In FIG. 11, the pointer 280 occludes the pointer 282 in the mirror (that is, the virtual image 284 occludes the virtual image 286). Consequently, the image sensor 40 views three pointer images while image sensor 42 views four pointer images. In FIG. 12, each image sensor 40 and 42 views three pointer images due to pointer image occlusion.

Pointer ambiguity arises when multiple pointers are in contact with the display surface 24 at different locations and are within the fields of view of the image sensors 40 and 42. If the pointers do not have distinctive markings to allow them to be differentiated, the observations of the pointers in each frame image produce true and false target results that cannot be readily differentiated. To avoid ambiguity, the pointer images obtained from the two image sensors have to be properly matched. If image sensor 40 views $k_1$ ($k_1$=1, 2, 3 or 4) pointer images, and image sensor 42 views $k_2$ ($k_2$=1, 2, 3 or 4) pointer images, then there are $k_1 k_2$ potential target locations for the two pointers and their images in mirror 36, where each potential target location may be determined by using two-camera triangulation. The system must find true target locations from the potential target locations. A search may be performed over the potential target locations ($k_1 k_2$) to find the true target locations associated with the two pointers.

In a preferred embodiment, an improved search method is used to reduce the computational complexity. With this method, the system maintains a lookup table storing all feasible line of sight combinations, which will be described in further detail below. When detecting pointer contacts, the system tests each feasible line of sight combinations by applying the pointer image data obtained from each of the image sensors 40 and 42 to check whether it gives rise to a reasonable solution, that is, two pairs of points where each are mirrored points with respect to the mirror 36.

A target location in this embodiment refers to the coordinates (x,y) of the pointer. A potential target location is identified by combining the lines of sight for each of the image sensors 40 and 42. As will be appreciated, if an image sensor sees four images, these images must correspond to two real and two virtual images. For example, in the exemplary scenario shown in FIG. 10A, each image sensor 40 and 42 has a real and virtual image for each of the pointers 280 and 282. There will be a real ($R_1$) and virtual ($V_1$) image for pointer 280 and a real ($R_2$) and virtual ($V_2$) image for pointer 282. Image sensor 40 obtains four images, corresponding to four lines of sight $L_1$, $L_2$, $L_3$ and $L_4$. Similarly, image sensor 42 obtains four images, corresponding to four lines of sight $S_1$, $S_2$, $S_3$, $S_4$. It needs to be determined which lines of sight can be combined to provide potential target locations for each of the real ($R_1$, $R_2$) images and which two lines of sight can be combined to provide potential target locations for each of the virtual ($V_1$, $V_2$) images. Each potential target location is tested to identify real and false target locations for each image of the pointers.

Figure 10B:
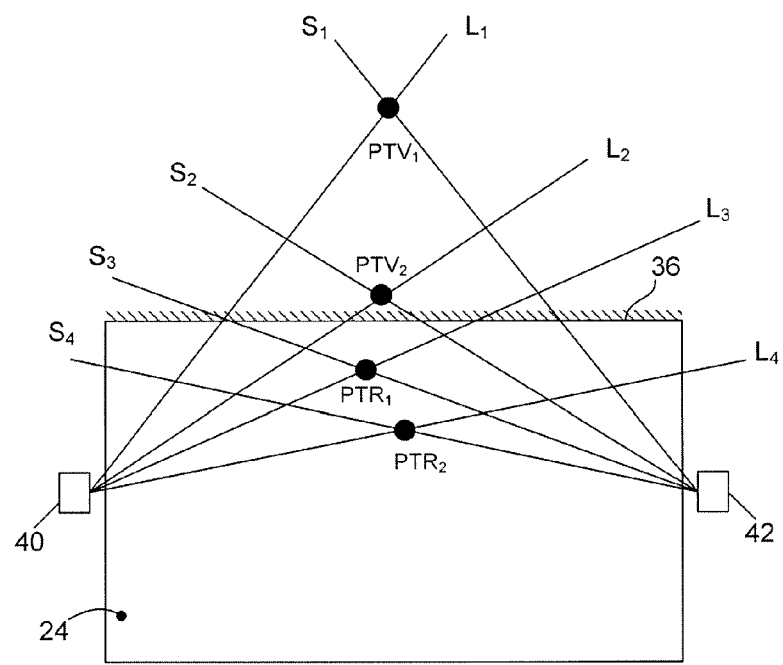
FIG. 10B illustrates possible lines of sight for the imaging devices when two pointers are in the region of interest.

A possible combination of lines of sight, as shown in FIG. 10B, may be $\{L_1 L_2 L_3 L_4 | S_1 S_2 S_3 S_4\} = \{V_1 V_2 R_1 R_2 | V_1 V_2 R_1 R_2\}$. The potential target locations are determined by matching the first four lines of sight with the last four having the same notation. In FIG. 10B, the corresponding potential target locations are $\{PTR_1, PTR_2, PTV_1, PTV_2\} = \{(L_3, S_3), (L_4, S_4), (L_1, S_1), (L_2, S_2)\}$. As shown, a potential target location for pointer 1 ($PTR_1$) is at the intersection of $L_3$ and $S_3$, the potential target location of a pointer 2 ($PTR_2$) is at the intersection of $L_4$ and $S_4$, a potential target location of the reflected view of pointer 1 ($PTV_1$) is at the intersection of $L_1$ and $S_1$, and the potential target location of the reflected view of pointer 2 ($PTV_2$) is at the intersection of $L_2$ and $S_2$.

The system will test this line of sight combination to determine whether or not this combination gives rise to a reasonable solution. As can be seen, potential target location for pointer 1 ($PTR_1$) and potential target location of the reflected view of pointer 1 ($PTV_1$) cannot be paired as the reflection of $PTR_1$ in mirror 36 does not result in the location of $PTV_1$. A similar result is found when testing $PTR_2$ and $PTV_2$. As a result, this combination of lines of sight does not give rise to a reasonable solution, and thus each of the potential target locations are identified to be false target locations.

Figure 10C:
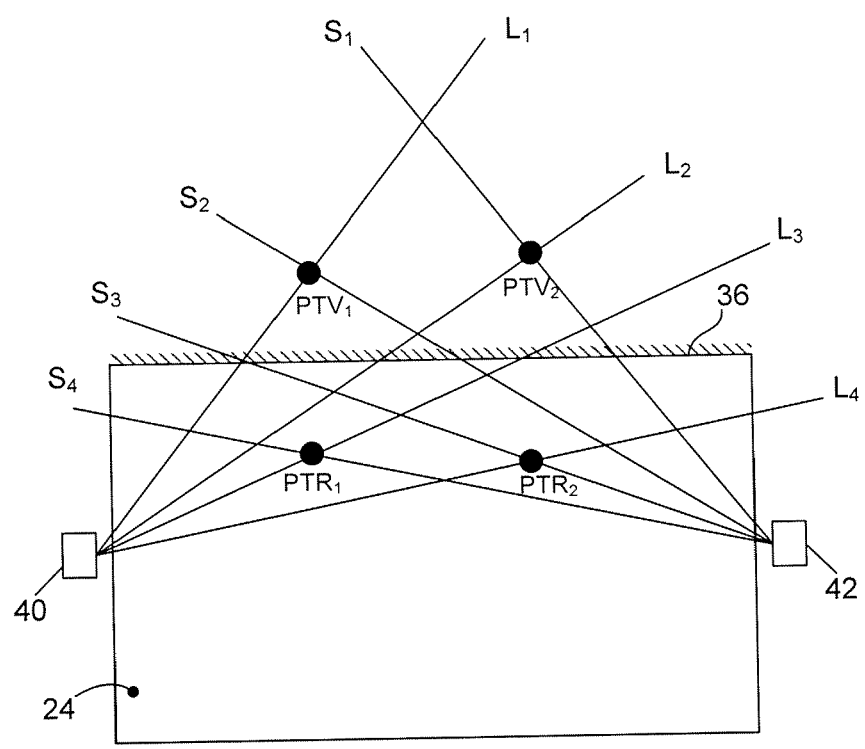
FIG. 10C illustrates possible lines of sight for the imaging devices when two pointers are in different positions in the region of interest than shown in FIG. 10B.

A second combination of lines of sight, as shown in FIG. 10C, may be $\{L_1 L_2 L_3 L_4 | S_1 S_2 S_3 S_4\} = \{V_1 V_2 R_1 R_2 | V_2 V_1 R_2 R_1\}$. A potential target location is determined by matching the first four lines of sight with the last four having the same notation. In FIG. 10C, the corresponding pointer position combination is $\{PTR_1, PTR_2, PTV_1, PTV_2\}$ $\{(L_3, S_4), (L_4, S_3), (L_1, S_2), (L_2, S_1)\}$. As shown, a potential target location for pointer 1 ($PTR_1$) is at the intersection of $L_3$ and $S_4$, the potential target location of a pointer 2 ($PTR_2$) is at the intersection of $L_4$ and $S_3$, a potential target location of the reflected view of pointer 1 ($PTV_1$) is at the intersection of $L_1$ and $S_2$, and the potential target location of the reflected view of pointer 2 ($PTV_2$) is at the intersection of $L_2$ and $S_1$.

The system will test this line of sight combination to determine whether or not this combination gives rise to a reasonable solution. As can be seen, potential target location for pointer 1 ($PTR_1$) and potential target location of the reflected view of pointer 1 ($PTV_1$) can be paired as the reflection of $PTR_1$ in mirror 46 directly results in the location of $PTV_1$. A similar result is found when testing $PTR_2$ and $PTV_2$. As a result, this combination of lines of sight does give rise to a reasonable solution, and thus each of the potential target locations is identified to be true target locations.

In cases where image sensor 40 and/or 42 view less than four pointer images, pointer image occlusion occurs, and some lines of sight may represent more than one pointer images. For example, in FIG. 11 where the image sensor 40 only sees three object images, any of the lines of sight $L_1$, $L_2$ and $L_3$ may be a combination of two pointer images. For example, a line of sight combination may be $\{L_1 L_2 L_3 | S_1 S_2 S_3 S_4\} = \{(R_1 R_2) V_1 V_2 | V_1 V_2 R_1 R_2\}$, where ($R_1 R_2$) means that $L_1$ corresponds to two pointer images $R_1$ and $R_2$. As an another example, $\{L_1 L_2 L_3 | S_1 S_2 S_3 S_4\} = \{R_1 (R_2 V_1) V_2 | V_1 V_2 R_1 R_2\}$ implies that $L_2$ corresponds to two pointer images $R_2$ and $V_1$.

Some line of sight combinations are redundant. That is, they are equivalent to other combinations after properly re-labeling the pointers and/or image sensors. For example, after exchanging the labels (i.e., the subscripts 1 and 2 associated with the symbols R and V) of the pointers, $\{L_1 L_2 L_3 L_4 | S_1 S_2 S_3 S_4\} = \{V_1 V_2 R_1 R_2 | V_1 V_2 R_1 R_2\}$ is the same as $\{L_1 L_2 L_3 L_4 | S_1 S_2 S_3 S_4\} = \{V_2 V_1 R_2 R_1 | V_2 V_1 R_2 R_1\}$. Also, after re-labeling the image sensors, the line of sight combinations for the cases where the left image sensor sees three objects and the right sensor sees four objects are the same as those for the cases where the right image sensor sees three objects and the left sensor sees four objects.

Some line of sight combinations are infeasible. For example, when the image sensor 40 sees four object images, the leftmost object image in the sensor's FOV (e.g., $L_1$ in FIG. 10A) is always a virtual image, and the rightmost object image in the sensor's FOV (e.g., $L_4$ in FIG. 10A) is always a real image. Thus, combinations having $L_1$ as a real image or $L_4$ as a virtual image, such as for example $\{L_1 L_2 L_3 L_4 | S_1 S_2 S_3 S_4\} = \{R_1 R_2 V_1 V_2 | V_1 V_2 R_1 R_2\}$, are infeasible.

The lookup table comprises all feasible line of sight combinations, that is, all $k_1 k_2$ ($k_1$ and $k_2$=1, 2, 3, or 4, respectively) combinations excluding the redundant and infeasible combinations. The lookup table is partitioned to sub-tables according to $k_1$ and $k_2$, where each sub-table, denoted as $k_1 \times k_2$ sub-table, comprises the combinations for cases where one sensor sees $k_1$ objects and the other sees $k_2$ objects. When detecting pointer contacts, the system only searches the relevant $k_1 \times k_2$ sub-table.

FIG. 12 shows an exemplary method for calculating potential multiple pointer contact target locations (step 112 of FIG. 5). When the method starts (step 340), the system determines if any of the image sensors 40 and 42 sees more than two objects (step 342). If no image sensor sees more than two objects, the system determines that only one pointer is in proximity with the display surface 24, and triangulates the pointer contact position as described above (step 344). The process then ends (step 350). At step 342, if at least one image sensor detects three or more objects, the system searches the relevant $k_1 \times k_2$ sub-table of the lookup table to find the two pointer contacts (step 346).

When searching the relevant $k_1 \times k_2$ sub-table, each line of sight combination is tested to determine potential target locations of the four points, where each target location is determined by using two-camera triangulation. Then, the system determines if the potential target locations form two mirrored pairs with respect to the mirror 36. As described above with reference to FIG. 9b, if a line of sight combination does not produce a reasonable solution, it is discarded as a false target location and the next combination in the sub-table is searched until the true line of sight combination is determined, and the true target location is identified. The process proceeds to step 348, where each pointer contact position is more accurately determined by using the four-camera triangulation method (if possible). The process then ends (step 350).

In an alternative embodiment, the computational cost is further reduced by dynamically identifying infeasible combinations in the sub-table during pointer contact detection.

Figure 14A:
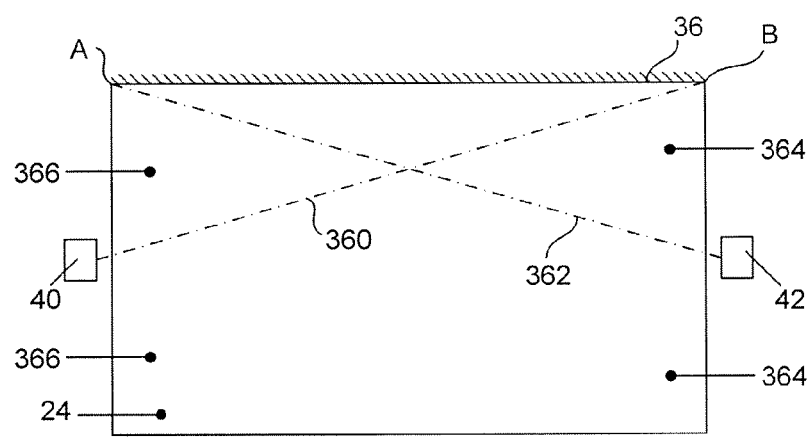
FIGS. 14A, 14B and 14C illustrate the fields of view (FOV) of each of two image sensors.
Figure 14B:
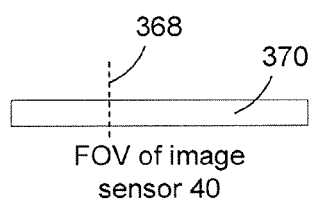
Figure 14C:
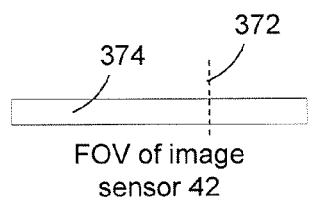

FIGS. 14A to 14C illustrate the field of view (FOV) of the image sensors used in the interactive input system in an alternative embodiment. The line 360 between the image sensor 40 and the end point B of the mirror 36 corresponds to a position 368 of the mirror boundary in the FOV of the image sensor 40. The line 360 defines a "real" area 364 therebelow, corresponding to a "real" region 370 in the FOV of the image sensor 370, in which any object seen by the image sensor 40 is always a real image. Similarly, the line 362 between the image sensor 42 and the end point A of the mirror 36, corresponding to the position 372 of the mirror boundary in the FOV of the image sensor 42, defines a "real" area 366 therebelow, corresponding to the "real" region 374 in the FOV of the image sensor 42, in which any object seen by the image sensor 40 is always a real image. As design parameters, the positions of the end points A and B of the mirror 36 are known, and thus the positions 368 and 372 are also known.

When searching the $k_1 \times k_2$ sub-table, the system checks whether a combination comprises a line of sight in the "real" region 370 (i.e., equivalently the area 364) or "real" region 374 (i.e., equivalently the area 366) for a virtual image. If yes, the combination is infeasible and is discarded without calculating any line of sight intersection.

Although the redirection bezels 30, 32 and 34 were described as being acrylic prisms, those of skill in the art will appreciate that the redirection bezels may be of any configuration that functions to receive and redirect excess light EL from the light source 50 across the display surface 24 to serve as pointer backlighting without requiring an additional light source. For example, the redirection bezels may be prisms made of glass or crystal, or may be shaped differently than a prism.

Alternative redirection bezels may be employed for each of the sides of the region of interest. Various combinations of redirection bezels may be employed, though preferably each redirection bezel is of the same configuration as the others. In an alternative embodiment, its surfaces may be coated with a reflective or diffusive material, such as silvered mirror coating, or the combination thereof. For example, one surface may be coated with a reflective material, and the other surface may be coated with a diffusive material.

Figure 15:
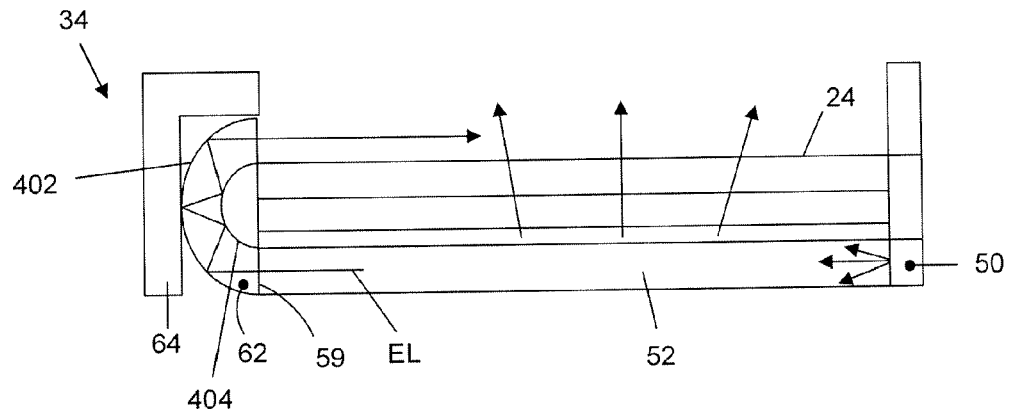
FIG. 15 is a cross-sectional view of part of an interactive input having an alternative illumination structure.

Turning now to FIG. 15, one alternative redirection structure is in the form of a curved light guide dimensioned in such a way that allows multiple total internal reflections of the excess light EL. In this embodiment, the redirection structure has two spaced apart reflective surfaces 400 and 402 for guiding the excess light EL and directing it across the region of interest. In an alternative embodiment, this light curved light guide may be comprised of a plurality of optical fibers.

Figure 16:
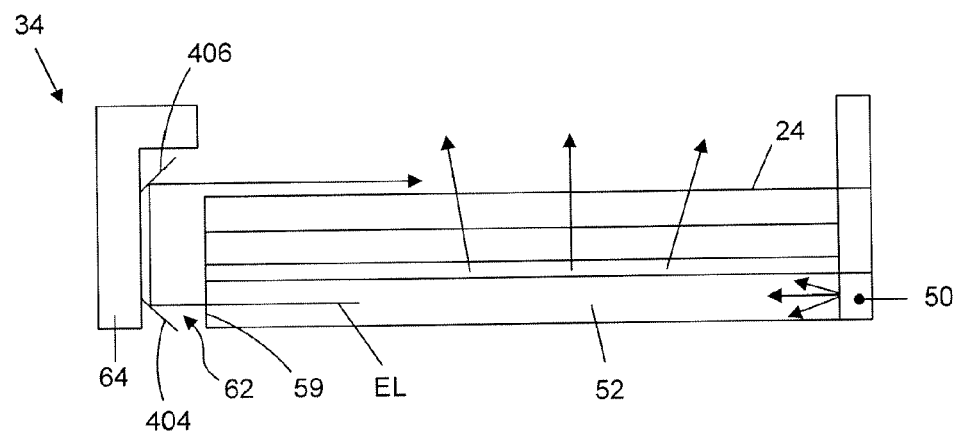
FIG. 16 is a cross-sectional view of part of an interactive input system having another alternative illumination structure.

FIG. 16 shows another embodiment of the redirection structure 62. As can be seen, the redirection structure 62 comprises pieces of reflective or diffusive boards 404 and 406 set at 45 degree angles and connected to bezel frame 64. Of course, both boards may be reflective or diffusive, or one may be reflective and the other may be diffusive. As will be appreciated, this alternative redirection structure may have more or less than two boards.

Figure 17:
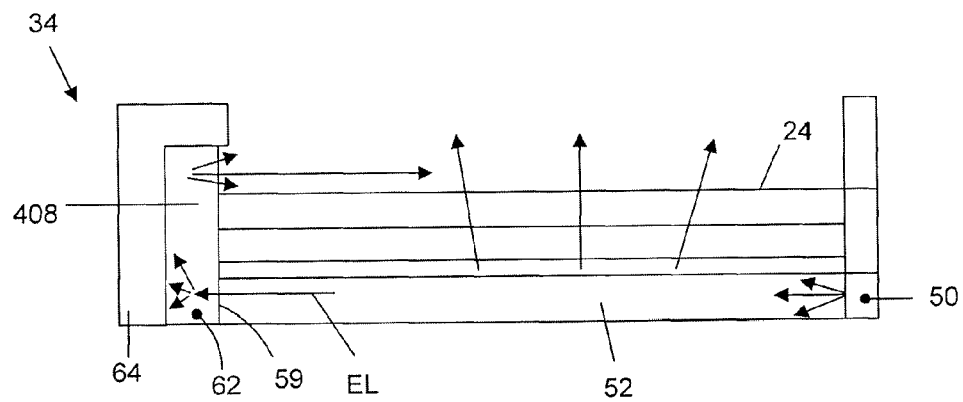
FIG. 17 is a cross-sectional view of part of an interactive input system having another alternative illumination structure.

FIG. 17 shows another embodiment of the redirection structure. As can be seen, in this embodiment the redirection structure comprises a diffusive block 408 that is configured to extend from the end surface 59 of the light guide 52 to a position slight higher than the display surface 24. The excess light EL is diffused inside the redirection structure 62, and a least a portion of the excess light EL is redirected across the display surface 24. As will be appreciated, the diffusive block may be one or more diffusive blocks.

Figure 18:
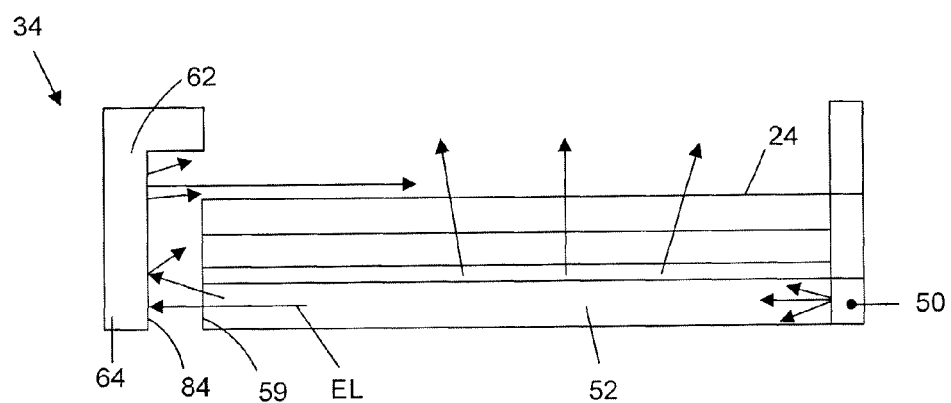
FIG. 18 is a cross-sectional view of part of an interactive input system having another alternative illumination structure.

Turning now to FIG. 18, yet another embodiment of the redirection structure is shown. The redirection structure is formed as part of the bezel frame 64. In this embodiment, the bezel frame 64 is coated with a layer of diffusive material 410. The excess light EL is diffused by the layer of diffusive material 410, and at least a portion of the excess light EL is redirected across the display surface 24.

Figure 19:
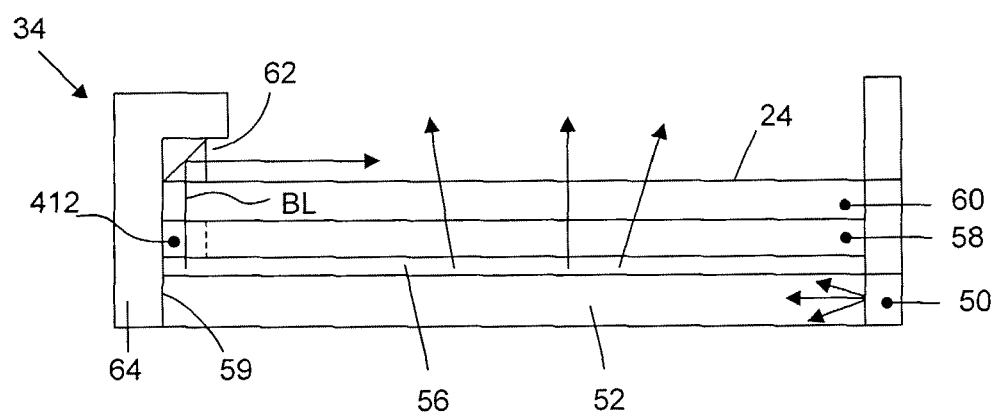
FIG. 19 is a cross-sectional view of part of an interactive input system having another alternative illumination structure.

FIG. 19 shows another alternative embodiment of the redirection structure, that is configured somewhat differently from the other embodiments. In this embodiment, the alternative redirection structure is a prism, mirror or a diffusive block attached to the bezel frame 64, above the display device (namely the protective layer 60). The bezel frame 64 is connected directly to the side of the display device. Rather than receive excess light produced by the light source 50 from below the display surface, the redirection structure receives excess light that has already passed through to above the display surface. More particularly, interrupts a narrow band 412 of the light L diffused up through the display surface 24 is considered the excess light (thus in effect the narrow band is not displayed to a viewer of the display surface, and is redirected across the display surface 24.

In the FIG. 19 embodiment, in operation the system 20 controls the LCD panel 58 such that the pixels in the narrow band 412 are always displaying a bright color. The bright color emitted by the backlight 50 in the narrow band 412 is then redirected by the redirection structure across the display surface 24. As will be appreciated, the light emitted by the pixels in the narrow band 412 will be considered excess backlight. In the event that the light emitted by the narrow band 412 needs to be modulated, the pixels in the narrow band 412 can be turned on and off as required.

As will be appreciated, a redirection structure may be made of materials with proper light attenuation factors such that the light redirected across the display surface 24 will not saturate the image sensors 40 and 42. Similarly, the end surface 59 of the light guide panel 52 may be coated with a semi-transparent layer to control the excess light EL emitted to the redirection structure.

Although the light source 50 was described to produce visible light, it will be appreciated that the light source may produce a different type of radiation, such as infrared light. In some embodiments, the image sensors 40 and 42 may only be sensitive to infrared illumination.

Although mirror 36 was described as extending along the fourth edge of the display surface 24, it will be appreciated that the fourth edge of the display surface 24 could be occupied by a fourth redirection segment. In such a configuration, the system would not be able to identify the pointer location by pairing the true (real and virtual) target locations, as there would be no virtual view of the display surface 24. The system would then rely on utilizing active display feedback to resolve all pointer ambiguities, according to the technique described in U.S. patent application Ser. No. 12/369,473 referred to above.

Although IR light sources 44 and 46 have been described as being infrared radiation sources, those of skill in the art will appreciate that such light sources could produce other types of radiation, such as visible light. If the visible light was emitted, the image sensors 40 and 42 would advantageously be sensitive only to visible light.

Although the image sensors 40 and 42 have been described as generally wide-angle cameras having a 180 degree field of view (FOV), image sensors with a FOV substantially less than 180 degrees may be employed.

In above examples, the image sensors 40 and 42, as well as the IR light sources 44 and 46, are located at a position approximately equal to the mid point of redirection bezels 30 and 32, respectively, those skilled in the art will appreciate that they may also be positioned at two adjacent corners of the touch surface, as taught in U.S. Pat. No. 7,232,986 referred to above.

Although embodiments have been described with reference to the drawings, those of skill in the art will appreciate that variations and modifications may be made without departing from the spirit and scope thereof as defined by the appended claims.

What is claimed is:

1. A method for determining the location of at least one pointer in an interactive input system comprising:
   capturing images generally across a display surface of a region of interest and a reflection of the region of interest;
   examining the images to determine at least one real target location and at least one virtual target location for at least one pointer that is within the region of interest;
   discarding infeasible combinations of the at least one real target location and the at least one virtual target location;
   analyzing feasible combinations of the at least one real target location and the at least one virtual target location to resolve at least one true real target location and at least one true virtual target location associated with the at least one pointer by determining at least one pair comprising the at least one real target location and the at least one virtual target location associated with a reflection of the at least one real target location in a mirror; and
   calculating a first real location for the at least one pointer corresponding to the at least one first true real target location and the at least one true virtual target location.

2. The method of claim 1 wherein the calculating is performed using triangulation.

3. An interactive input system comprising:
   a region of interest associated with a display surface;
   a mirror positioned with respect to the region of interest and producing a reflection thereof;
   an imaging system capturing images of the region of interest and the reflection from different vantages; and
   processing structure for examining the captured images to determine at least one real target location and at least one virtual target location for at least one pointer in the region of interest, discarding infeasible combinations of the at least one real target location and the at least one virtual target location, analyzing feasible combinations of the at least one real target location and the at least one virtual target location to resolve at least one real true target location and at least one true virtual location associated with the at least one pointer by determining at least one pair comprising the at least one real target location and the at least one virtual target location associated with a reflection of the at least one real target location in the mirror, and calculating a first real location for the at least one pointer corresponding to the at least one first true real target location and the at least one true virtual target location.

4. A non-transitory computer readable medium embodying a computer program for determining the location of at least one pointer in an interactive input system, the computer program comprising:
   program code for capturing images generally across a display surface of a region of interest and a reflection of the region of interest;
   program code for examining the images to determine at least one real target location and at least one virtual target location for at least one pointer that is within the region of interest;
   program code for discarding infeasible combinations of the at least one real target location and the at least one virtual target location;
   program code for analyzing feasible combinations of the at least one real target location and the at least one virtual target location to resolve at least one true real target location and at least one true virtual target location associated with the at least one pointer by determining at least one pair comprising the at least one real target location and the at least one virtual target location associated with a reflection of the at least one real target location in a mirror; and
   program code for calculating a first real location for the at least one pointer corresponding to the at least one first true real target location and the at least one true virtual target location.

5. A method for determining the location of at least two pointers in an interactive input system comprising:
   capturing images from different vantages of a region of interest and a reflection of the region of interest;
   examining the images to identify a plurality of real target locations and a plurality of virtual target locations for at least two pointers in the region of interest;
   discarding infeasible combinations of the plurality of real target locations and the plurality of virtual target locations;
   analyzing feasible combinations of the plurality of real target locations and the plurality of virtual target locations to resolve a true real target location and a true virtual target location associated with each of the at least two pointers by determining a pair comprising one of the plurality of real target locations and one of the plurality of virtual target locations associated with a reflection of the at least one real target location in a mirror; and
   calculating a real location for each of the at least two pointers associated with the corresponding true real target location and the corresponding true virtual location associated with the at least one true virtual target location.

6. The method of claim 5 comprising comparing the real location to the virtual location, and in response, determining location of the first of the at least two pointers.

7. An interactive input system comprising:
a region of interest associated with a display surface;
a mirror producing a reflection of the region of interest;
an imaging system capturing from different vantages images of the region of interest and the reflection; and
processing structure for examining the images to identify a plurality of real target locations and a plurality of virtual target locations for at least two pointers in the region of interest, discarding infeasible combinations of the plurality of real target locations and the plurality of virtual target locations, analyzing feasible combinations of the plurality of real target locations and the plurality of virtual target locations to resolve a true real target location and a true virtual target location associated with each of the at least two pointers by determining a pair comprising one of the plurality of real target locations and one of the plurality of virtual target locations associated with a reflection of the at least one real target location in a mirror, and calculating a real location for each of the at least two pointers associated with the corresponding true real target location and the corresponding true virtual location associated with the at least one true virtual target location.

8. A non-transitory computer readable medium embodying a computer program for determining a location of at least two pointers in an interactive input system, the computer program comprising:

program code for capturing images from different vantages of a region of interest and a reflection of the region of interest;

program code for examining the images to identify a plurality of real target locations and a plurality of virtual target locations for at least two pointers in the region of interest;

program code for discarding infeasible combinations of the plurality of real target locations and the plurality of virtual target locations;

program code for analyzing feasible combinations of the plurality of real target locations and the plurality of virtual target locations to resolve a true real target location and a true virtual target location associated with each of the at least two pointers by determining a pair comprising one of the plurality of real target locations and one of the plurality of virtual target locations associated with a reflection of the at least one real target location in a mirror; and program code for calculating a real location for each of the at least two pointers associated with the corresponding true real target location and the corresponding true virtual location associated with the at least one true virtual target location.

* * * * *